Feb. 11, 1969  A. M. SCHWARZ  3,427,149
PROCESS FOR REMOVING ARSENIC FROM IRON ORE
Filed Feb. 14, 1966
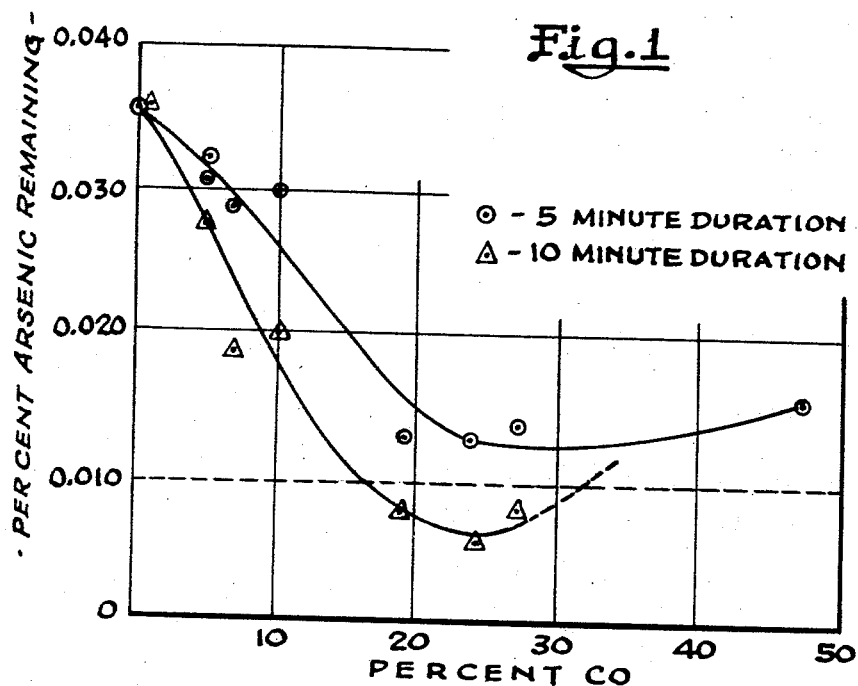
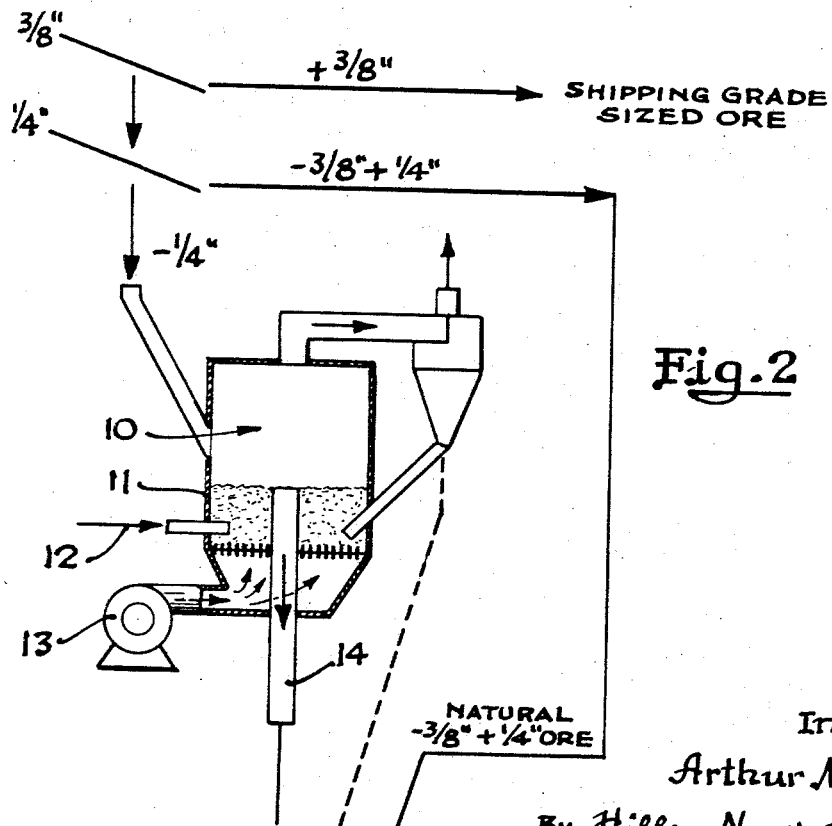
Inventor
Arthur M. Schwarz
By Hibben, Noyes & Bicknell
Attorneys United States Patent Office 3,427,149
Patented Feb. 11, 1969

3,427,149
PROCESS FOR REMOVING ARSENIC
FROM IRON ORE
Arthur M. Schwarz, Munster, Ind., assignor to Inland
Steel Company, Chicago, Ill., a corporation of Delaware
Filed Feb. 14, 1966, Ser. No. 527,366
U.S. Cl. 75—6                                    20 Claims
Int. Cl. C21b 1/04; C22b 1/02

ABSTRACT OF THE DISCLOSURE

Treating a fluxed or unfluxed iron ore containing arsenic as an impurity to provide a heat treated iron ore product having an arsenic content below 0.015 percent by weight and suitable for use in a blast furnace by contacting the iron ore at a temperature between about 1600° F. and 2000° F. with a controlled reducing atmosphere.

---

The present invention relates generally to the preparation of iron ore products for use in the production of iron and steel, and more particularly to an improved method of producing from an iron ore containing arsenic as an objectionable impurity an iron ore product having an arsenic content suitable for use in producing all types of sheet iron and steel products, and to an improved method of producing fluxed iron ore in the form of fines or pellets having a low arsenic content from an iron ore initially having an objectionably high arsenic content.

In the search for iron ores which are suitable for use in a blast furnace or the like for producing iron and steel, certain iron ores with the desired iron content have been found which contain an excessive amount of impurities, such as arsenic. The arsenic content of sheet steel for use in the manufacture of containers for foods and beverages, for example, are maintained at very low levels, and an iron ore having an arsenic content as high as .03 and .04% by weight is considered objectionable for use in producing sheet steel for food and beverage containers. It is the practice, therefore, to restrict the arsenic content of iron ore for use in the production of steel for food and beverage containers and the like to a maximum of fifteen thousandths of a percent arsenic by weight, and preferably below ten thousandths of a percent arsenic by weight.

Heretofore various procedures have been suggested or used for removing arsenic from iron ore, including roasting at elevated temperatures, heating the ore in the presence of lime to react the lime with the arsenic, and heating the ore in an atmosphere having as an essential ingredient thereof a high carbon dioxide content. None of these prior art procedures, however, have been effective in reducing in an economical manner the arsenic content of an iron ore in the form of fines or pellets to below a concentration of about .015% by weight arsenic.

There has also been increasing recognition in the metallurgical art that the yield of a blast furnace can be significantly increased by charging the iron ore to the blast furnace in an agglomerated form with all or part of the flux material required in the chemical reactions which take place in a blast furnace. For example, it is common practice to include limestone as a fluxing agent for the iron ore charged to a blast furnace and to agglomerate the iron ore-limestone mix into iron ore sinter or heat hardened pellets before charging to the blast furnace. Iron ore sinter and iron ore pellets which contain added basic matter sufficient to react with all of the silica and other acid matter in the iron ore are called "self-fluxing," and those iron ore products which contain sufficient basic material to react with only a portion of the silica and other acidic components of the iron ore are designated as "partially fluxed." A substantially increased rate of production of the blast furnace is achieved when a self-fluxing iron ore sinter or iron ore pellets are used in the blast furnace, and it is therefore highly desirable to develop an economical method for producing good quality fluxed iron ore sinter and fluxed iron ore pellets from iron ores which contain arsenic as an impurity.

In processing iron ore containing an objectionable concentration of arsenic for use in a blast furnace, either in the form of fines, sinter or pellets, difficulties are encountered due to the presence of the arsenic, particularly when producing a fluxed iron ore product. For example, when an iron ore having an objectionable arsenic content is subjected to conventional treatment with limestone as the fluxing agent used in an amount sufficient to react with only 50% by weight of the silica in the iron ore, the arsenic in the iron ore is not completely or even largely removed during the heat treating process. It has been found, for example, that even when heating to temperatures in excess of 2400° F. for about 20 minutes, iron ore sinter mixtures containing from 0% to about 14% by weight limestone, the percentage of arsenic removal decreases from about 90% when no limestone is present to only 3% arsenic removal when about 14% limestone is present in the sinter mixture. With a fully self-fluxing iron ore sinter mixture containing 15% limestone, no arsenic is removed when the sinter mixture is sintered in the conventional manner on a sintering strand.

It is therefore an object of the present invention to provide an improved method of effecting a reduction in the arsenic content of an iron ore in an economical and convenient manner.

It is another object of the present invention to provide an improved method of reducing the arsenic content of an iron ore in the form of fines.

It is a further object of the present invention to provide an improved method of reducing the arsenic content of an iron ore in the form of pellets.

It is still a further object of the present invention to provide an economical method of producing a fluxed iron ore product having a low arsenic content from an iron ore initially having an objectionably high arsenic content.

Still another object of the present invention is to provide an improved method of producing fluxed iron ore pellets and fines having a low arsenic content from an iron ore initially having an objectionably high arsenic content.

Other objects of the present invention will be apparent from the detailed description and claims to follow when read in conjunction with the accompanying drawing, wherein:

FIG. 1 is a graph showing the arsenic content of an iron ore treated in accordance with the present invention; and FIG. 2 is a schematic side elevational view of apparatus suitable for use in practicing the present invention.

It has now been discovered that arsenic can be economically removed from iron ore when the ore is either in the form of fines or pellets to provide an acceptable concentration of arsenic from iron ore which initially has an objectionable arsenic content by heating the iron ore at a temperature between about 1600° F. and about 2000° F. in a controlled slightly reducing atmosphere for a period of between about 5 and 20 minutes. More particularly, an iron ore initially having an objectionable arsenic content of about 0.035 to 0.040% by weight on a dry basis when treated in accordance with the present invention will have the arsenic content thereof reduced to a maximum of 0.015% by weight and generally to below 0.01% by weight arsenic.

One embodiment of the slightly reducing atmosphere which can be employed in the present invention is an atmosphere having from about 10% to below about 50% by volume carbon monoxide, from 0% to about 15% by volume carbon dioxide, and the remainder essentially nitrogen. For a treating period of between about 5 and 20 minutes, a practical working range for the carbon monoxide content where the carbon monoxide provides essentially all the reduction is between about 17 and about 30 percent by volume carbon monoxide. Where longer treating periods are used concentrations of carbon monoxide below 17% can be used. A specific embodiment of a slightly reducing atmosphere within the foregoing working range comprises 22% carbon monoxide, 6% carbon dioxide, and 72% $N_2$. If desired, a part of the carbon monoxide in the slightly reducing atmosphere can be replaced by hydrogen. Thus, another slightly reducing atmosphere suitable for use in the present invention contains about 2% hydrogen, 7% carbon monoxide, and 10% carbon dioxide, with the balance being essentially nitrogen. In addition, a combination of 5% carbon monoxide and 4% hydrogen by volume in place of the 2% hydrogen and 7% carbon monoxide has also provided effective reduction, and, in general, the combined percentage by volume of carbon monoxide and hydrogen should total about 10 percent. Other slightly reducing atmospheres having the equivalent effective reducing power can, of course, be used in the present invention.

The effect of changes in the composition of the reducing gas and the retention time on the removal of arsenic from Caland iron ore originally containing 0.035% by weight arsenic on a dry basis (0.038% on anhydrous basis) while heating at a temperature of 1800° F. is shown in the following Tables I and I(a):

TABLE I.—PERCENT ARSENIC REMAINING IN CALAND ORE FINES

| Gas Composition, Vol. Percent | | | | Wt. Percent Arsenic Remaining, Time, Min.— |
|---|---|---|---|---|
| CO | $H_2$ | $CO_2$ | $N_2$ | 10 |
| 10 | | 5 | 85 | .012 |
| 24 | | 6 | 70 | .006 |
| 7 | 2 | 10 | 81 | .006 |

TABLE I(a).—PERCENT ARSENIC REMAINING IN CALAND ORE PELLETS

| Gas Composition, Vol. Percent | | | Wt. Percent Arsenic Remaining, Time, Min.— | |
|---|---|---|---|---|
| CO | $CO_2$ | $N_2$ | 5 | 10 |
| 5 | | 95 | .031 | |
| 5 | 10 | 85 | .032 | .028 |
| 10 | 5 | 85 | .030 | .020 |
| 10 | | 90 | .030 | |
| 19 | 9 | 72 | .013 | .008 |
| 24 | 6 | 70 | .013 | .006 |
| 27 | 4 | 69 | .014 | .008 |
| 47 | | 53 | .016 | |
| | 27 | 73 | .037 | |
| | 100 | | .037 | |

The tests which have been carried out with reducing gases of varying carbon monoxide concentration show that the percentage of arsenic removal from pellets increases as the carbon monoxide content of the reducing gas increases up to a carbon monoxide concentration of about 25% by volume. It was found that when the carbon monoxide concentration of the reducing gas was increased from above about 10% to substantially above about 30% by volume, however, there was no further significant improvement in the removal of arsenic. The data also indicate that the carbon dioxide content of the reducing gas does not have a significant effect on the removal of arsenic, and the best results are obtained when the carbon dioxide content of the slightly reducing atmosphere is limited to a maximum of about 10% by volume. Optimum removal of arsenic was obtained when the pellets were treated with a reducing gas containing between about 19% and 27% by volume carbon monoxide. It is also evident, however, that when a portion of the carbon monoxide is replaced by an equivalent amount of hydrogen gas, the same degree of arsenic removal is effected as when the Caland ore is treated with a reducing gas containing the larger concentration of carbon monoxide.

One method which has been found convenient for producing a slightly reducing atmosphere suitable for use in the present invention is by incomplete combustion of propane gas, natural gas or fuel oil in a burner mounted adjacent the iron ore to be treated and drawing the gaseous product through a quiescent or fluidized bed of iron ore or while tumbling the iron ore in an inclined rotary kiln. Another convenient means of effecting the slightly reducing atmosphere is by intimately mixing with the iron ore which, if desired, may then be pelletized, a calculated amount of combustible carbonaceous solid fuels, such as about 15–35% by weight coal fines, coke breeze or lignite with the ore and heating the ore bed in the presence of a controlled amount of air. However, any other method of providing and contacting the iron ore with a slightly reducing atmosphere such as described herein and known to one skilled in the art can be used.

The iron ore in the form of fines, preferably having an average particle size of about 6 mesh or below, can be treated with the slightly reducing atmosphere in a number of conventional apparatuses to effect removal of arsenic. Larger particles of iron ore can also be used with, however, a corresponding increase in the retention time in the slightly reducing atmosphere of the treating zone. The iron ore can be treated with the slightly reducing atmosphere on a continuously moving grate, in a rotary kiln or in a fluidized bed. For example, a continuous moving strand-type apparatus, such as a Dwight-Lloyd apparatus, can be used to treat a quiescent bed of iron ore fines with a slightly reducing atmosphere produced by gas burners to effect removal of the arsenic to a concentration below 0.015% by weight. Another apparatus for treating large volumes of iron ore in accordance with the present invention is a rotary kiln having gas burners disposed therein supplying a slightly reducing gas to the interior of the kiln to effect heating and the removal of arsenic from the ore.

In FIG. 2 of the drawings is shown still another apparatus for treating the iron ore in the form of a fluidized bed wherein ore having a particle size less than one quarter inch is charged into a cylindrical chamber 10 to form a bed and a slightly reducing atmosphere is passed through the bed to effect fluidizing the bed by means of fuel gun 12 and blower 13. The calcined, slightly reduced ore product substantially free of arsenic is passed outwardly through an axial opening 14.

In the following Table II are shown comparative results of heating a quiescent bed of Caland ore fines having a particle size of less than three-sixteenths of an inch and initially containing 0.035% arsenic by weight on a dry basis in (1) an oxidizing and (2) a reducing atmosphere:

TABLE II.—PERCENT ARSENIC REMAINING

| Temp., °F. | (1) Oxidizing Atmosphere | | | (2) Reducing Atmosphere | | | |
|---|---|---|---|---|---|---|---|
| | Time, Min. | | | Time, Min. | | | |
| | 10 | 20 | 30 | 5 [1] | 10 [1] | 10 [2] | 20 [1] |
| 1,400 | .038 | | | .037 | | | |
| 1,500 | .038 | | | .030 | .030 | | |
| 1,600 | | | | .028 | .020 | | .013 |
| 1,700 | | | | .014 | .010 | .018 | |
| 1,800 | .038 | | | .007 | .006 | .004 | |
| 1,900 | .035 | | | .005 | .005 | | |
| 2,000 | .032 | .030 | | | | | |
| 2,100 | .019 | .021 | .009 | | | | |

[1] = 22% CO, 6% $CO_2$, and 72% $N_2$ Atmosphere.
[2] = 7% CO, 2% $H_2$, 10% $CO_2$, and 81% $N_2$ Atmosphere.

The foregoing data show that in an oxidizing atmosphere, a temperature of 2100° F. and a retention time of 30 minutes are required to reduce the arsenic contained in the ore fines to below 0.01%; whereas when heating the same ore in a slightly reducing atmosphere having the indicated composition at a temperature of only 1800° F. for 5 minutes a similar reduction in the arsenic content of the ore is effected. It can also be seen from the data that only 15% of the arsenic contained in the ore can be removed by heating in an oxidizing atmosphere at 2000° F. and a retention time of 10 minutes.

When the Caland iron ore fines were heated in a reducing atmosphere of the present invention in a fluidized bed, such as illustrated in FIG. 2, at a temperature of 1700° F. for 15 minutes, it was found that the arsenic content was reduced to 0.007% by weight arsenic and the product was simultaneously prereduced to 67.7% iron and 27.4% iron oxide (FeO). The reducing atmosphere in the foregoing fluidized bed was provided by incomplete combustion of the propane gas used for heating the iron ore.

There is more difficulty in removing arsenic from the Caland ore when the ore is in the form of pellets than when in the form of ore fines. Thus, in the following Table III is shown the effect of variations in time and temperature on the removal of arsenic when treating pelletized Caland ore containing 0.035% arsenic by weight (dry basis) by heating in a tube furnace in (1) an oxidizing atmosphere and (2) in a reducing atmosphere:

TABLE III.—PERCENT ARSENIC REMAINING

| Temp., ° F. | (1) Oxidizing Atmosphere Time, Min. | | | | (2) Reducing Atmosphere [1] Time, Min. | | |
|---|---|---|---|---|---|---|---|
| | 5 | 10 | 15 | 20 | 3 | 5 | 10 |
| 1,600 | | .038 | | | | .030 | .021 |
| 1,700 | | | | | .019 | .018 | .013 |
| 1,800 | | .038 | | | .014 | .013 | .008 |
| 1,900 | | .038 | | .036 | | .006 | .004 |
| 2,000 | | .032 | | .032 | | | |
| 2,100 | | .027 | | .026 | | | |
| 2,200 | .022 | .021 | .021 | .018 | | | |
| 2,300 | .019 | .012 | .010 | .009 | | | |
| 2,400 | .011 | .009 | | .004 | | | |

[1] 22% CO, 6% CO$_2$, and 72% N$_2$.

It will be evident that the reducing atmosphere is much more effective in removing arsenic from the Caland ore pellets than an oxidizing atmosphere. Thus, the data of Table III show that about the same percentage of arsenic is removed by heating the pellets in a reducing atmosphere at 1800° F. for 10 minutes as obtained when heating the pellets in an oxidizing atmosphere for 10 minutes at 2400° F. It is also evident that in a reducing atmosphere a retention time of only 3 minutes at 1800° F. is required to reduce the arsenic contained in the Caland ore pellets below 0.015% by weight.

The results of the foregoing tests on the removal of arsenic from the Caland ore pellets (Table III) were confirmed in pot-grate tests with pellets having the same composition and wherein the reducing gases were produced with a burner by incomplete combustion of natural gas with the average temperature of the pellet bed being 1900° F. As shown in the following Table IV, a 6-inch bed of Caland ore pellets after exposure for 10 minutes at temperatures between 1700° F. and 2000° F. in a slightly reducing atmosphere comprising about 22% carbon monoxide and 6% carbon dioxide had an arsenic content less than .005%:

TABLE IV

| Temperature | Percent FeO | Percent Arsenic |
|---|---|---|
| 2,000° F., Upper 2″ Layer | 26.25 | .002 |
| 1,900° F., Middle 2″ Layer | 32.12 | .003 |
| 1,700° F., Bottom 2″ Layer | 27.28 | .004 |

The beneficial effect produced by a slightly reducing atmosphere on the removal of arsenic from an influxed iron ore whether in the form of fines or pellets is unexpectedly obtained when the iron ore is mixed with limestone to provide a fluxed iron ore. The following Table V shows the effect of variations in time and temperature on the removal of arsenic from a mixture of 3/16 inch Caland ore fines containing 14% by weight minus 6 mesh limestone when heating in (1) an oxidizing atmosphere and (2) a slightly reducing atmosphere:

TABLE V.—PERCENT ARSENIC REMAINING IN CALAND ORE FINES CONTAINING 14% BY WT. LIMESTONE

| Temp., ° F. | (1) Oxidizing Atmosphere Time, Min. | | (2) Reducing Atmosphere [1] Time, Min. | | |
|---|---|---|---|---|---|
| | 10 | 20 | 10 | 15 | 20 |
| 1,700 | .036 | .036 | | | |
| 1,800 | | | .026 | .017 | .010 |
| 1,900 | .035 | | .019 | .012 | |
| 2,000 | .035 | .035 | .012 | .006 | |
| 2,100 | .035 | | | | |
| 2,200 | .036 | .035 | | | |
| 2,300 | .036 | | | | |
| 2,400 | .030 | .030 | | | |

[1] 22% CO, 6% CO$_2$, and 72% N$_2$.

The data of the following Table VI indicate that incorporating 14% by weight limestone fines (−70 mesh) in Caland iron ore pellets substantially prevents the removal of arsenic during firing of the pellets in an oxidizing atmosphere, since there was no significant arsenic removed from the fluxed pellets containing 14% by weight limestone heated at 2300° F. for 10 minutes and less than 20% of the arsenic in the ore was removed when the pellets were heated at 2400° F. for 20 minutes. However, when the same Caland iron ore pellets containing 14% limestone fines (−70 mesh) were heated in the specified slightly reducing atmosphere, the limestone did not appear to seriously interfere with the removal of arsenic from the pellets. Thus, when heating pellets initially containing .038% arsenic (anhydrous basis) in a reducing atmosphere containing 22% carbon monoxide at a temperature of 1900° F. for 15 minutes the pellets produced had an arsenic content of .015% by weight. When the pellets were heated in a reducing atmosphere at 2000° F. for 15 minutes, the pellets produced had an arsenic content of only .008% by weight.

TABLE VI.—PERCENT ARSENIC REMAINING IN CALAND ORE PELLETS CONTAINING 14% BY WT. LIMESTONE

| Temp., ° F. | (1) Oxidizing Atmosphere Time, Min. | | (2) Reducing Atmosphere [1] Time, Min. | | |
|---|---|---|---|---|---|
| | 10 | 20 | 10 | 15 | 20 |
| 1,500 | .037 | .036 | | | |
| 1,600 | | | | .036 | .027 |
| 1,700 | .037 | .036 | | .030 | |
| 1,800 | | | .029 | .021 | .014 |
| 1,900 | .035 | | .020 | .015 | .009 |
| 2,000 | .034 | | .014 | .008 | |
| 2,100 | .034 | | | | |
| 2,200 | .035 | .035 | | | |
| 2,300 | .035 | | | | |
| 2,400 | .035 | .030 | | | |

[1] 22% CO, 6% CO$_2$, and 72% N$_2$.

As previously indicated, the slightly reducing atmosphere used for treating the iron in accordance with the present invention can be provided by admixing various reducing agents with the iron ore and heating the mixture in a non-oxidizing atmosphere or in a limited amount of oxidizing atmosphere. In the following Table VII the indicated reducing agents were mixed with the Caland ore and heated in the indicated manner to effect removal of arsenic:

TABLE VII.—PERCENT ARSENIC REMAINING IN CALAND ORE

| Rention Time, Min | Additive | |
|---|---|---|
| | 33% Charcoal [1] | Illinois Coal |
| | 20 | 20 |
| Temperature, °F.: | | |
| 1,800 | | [2] .009 |
| 1,800 | | |
| 2,000 | | [3] .005 |
| 2,100 | [4] .015 | |
| 2,200 | | |

[1] Approximately a third of the charcoal was used up in the firing process.
[2] The partially reduced ore analyzed 31.8% FeO, 33% Illinois coal was used.
[3] 10% Illinois No. 6 coal was used and heating was in a $CO_2$ atmosphere.
[4] The partially reduced pellets analyzed 76.6% FeO.

The data of Table VII show that the addition of a solid fuel to the Caland ore fines has a beneficial effect on the removal of arsenic. It was found that heating a mixture of Caland ore and charcoal (14 grams pellets and 7 grams charcoal) in an oxidizing atmosphere at 2100° F. for 20 minutes produced pellets containing .015% arsenic. Also, heating a mixture of 90% Caland ore fines and 10% Illinois coal in a carbon dioxide atmosphere at 2000° F. for 20 minutes produced pellets containing .005% arsenic. It is thus clearly evident that the arsenic can be effectively removed from the Caland ore by mixing the iron ore fines and green pellets with a reducing agent in the form of a solid fuel.

It will be evident that the present invention provides means for reducing the arsenic content of a Caland-type iron ore to a very low level which can be carried out at a relatively low temperature with various conventional apparatus and inexpensive reducing agents, particularly the carbonaceous solid fuels, thereby making the removal of the arsenic technically and economically feasible for both fluxed and unfluxed iron ores. And, since the arsenic can be substantially removed from iron ore pellets at the relatively low temperatures used during the preheating stage prior to firing and simultaneously converting the hematite pellets into slightly magnetic material, there is a significant saving in the amount of fuel required for firing the pellets because the hot exhaust gases from the firing zone are arsenic-free and can be recycled and reused in the drying and preheating steps of the pelletizing process.

I claim:

1. A process of treating an iron ore initially having between 0.015% and about 0.04% by weight arsenic to effect reduction of the arsenic content of said iron ore comprising; intimately contacting within a treating zone said iron ore and a reducing gas composed of between about 10% and 30% by volume carbon monoxide, a maximum of about 15% by volume carbon dioxide and the balance mainly nitrogen while said ore is at a temperature between about 1600° F. and 2000° F., maintaining said gas and said ore in intimate contact for a period of about 5 to 20 minutes, and withdrawing said arsenic in gaseous form from said treating zone admixed with said reducing gas to provide iron ore having below 0.015% by weight arsenic.

2. A process as in claim 1, wherein said iron ore is in the form of fines.

3. A process as in claim 1, wherein said iron ore is in the form of pellets.

4. A process as in claim 1, wherein said reducing gas comprises between about 19% and about 27% by volume carbon monoxide, a maximum of 15% by volume carbon dioxide, and the balance mainly nitrogen.

5. A process as in claim 1, wherein said reducing gas contains a combined percent by volume of carbon monoxide and hydrogen which totals about 10 percent.

6. A process as in claim 1, wherein said iron ore is in an agglomerated form.

7. A process as in claim 1, wherein said contacting of the iron ore with said reducing gas is accomplished by mixing between about 10% and 35% by weight of a particulate combustible carbonaceous solid fuel with said iron ore and effecting heating of the mixture of iron ore and said solid fuel to said temperature in the presence of a controlled amount of air.

8. A process as in claim 7, wherein said combustible carbonaceous solid fuel is selected from the group consisting of charcoal, coal fines, coke breeze and lignite.

9. A process as in claim 1, wherein said contacting of the iron ore with said reducing gas is accomplished by mixing about 10% by weight particulate charcoal with said iron ore, and firing the resultant mixture in a limited amount of oxidizing atmosphere.

10. A process as in claim 1, wherein said contacting of the iron ore with said reducing gas is accomplished by mixing about 10% by weight particulate coal with said iron ore, and contacting the resulting mixture at said temperature with a carbon dioxide atmosphere.

11. A process as claim 1, wherein said contacting of the iron ore with said reducing gas is accomplished by effecting incomplete combustion of natural gas and bringing the resultant combustion products into intimate contact with said iron ore.

12. A process as in claim 1, wherein said iron ore is mixed with a particulate iron ore fluxing agent for reacting with at least a portion of the silica contained in said iron ore prior to contacting said iron ore with said reducing gas.

13. A process as in claim 12, wherein said fluxing agent comprises limestone.

14. A process as in claim 12, wherein said fluxing agent comprises about 14% by weight limestone.

15. A process as in claim 12, wherein said iron ore is a Caland iron ore.

16. A process as in claim 12, wherein said iron ore is a hematite iron ore.

17. A process as in claim 1, wherein said iron ore is a Caland iron ore.

18. A process as in claim 1, wherein said iron ore is a hematite iron ore.

19. A process of treating a fluxed iron ore initially having more than 0.015% by weight arsenic as an impurity to reduce the arsenic content thereof comprising; intimately contacting within a treating zone said iron ore mixed with an iron ore fluxing agent for reacting with at least a portion of the silica contained in said iron ore with a reduction gas comprised of about 7% carbon monoxide and 2% hydrogen, about 10% carbon dioxide with the remainder being mainly nitrogen while said ore is at a temperature between about 1600° F. and 2000° F., maintaining said gas and said ore in intimate contact for a period of about 5 to 20 minutes, and withdrawing said arsenic in gaseous form from said treating zone admixed with said reducing gas to provide a heat treated fluxed iron ore having a reduced arsenic content.

20. A process of treating a fluxed iron ore initially having more than 0.015% by weight arsenic as an impurity to reduce the arsenic content thereof comprising; intimately contacting within a treating zone said iron ore mixed with an iron ore fluxing agent for reacting with at least a portion of the silica contained in said iron ore with a reducing gas comprised of about 5% carbon monoxide and 4% hydrogen, about 10% carbon dioxide with the remainder being mainly nitrogen while said ore is at a temperature between about 1600° F. and 2000° F., maintaining said gas and said ore in intimate contact for a period of about 5 to 20 minutes, and withdrawing said arsenic in gaseous form from said treating zone admixed with said reducing gas to provide a heat treated fluxed iron ore having a reduced arsenic content.

References Cited

UNITED STATES PATENTS

| | | | |
|---|---|---|---|
| 879,931 | 2/1908 | Westman | 75—6 |
| 1,718,825 | 6/1929 | Kirmse et al. | 75—6 |
| 1,923,511 | 8/1933 | Scheil | 75—6 |
| 2,977,215 | 3/1961 | Meyer et al. | 75—6 |
| 3,285,735 | 11/1966 | Phelps | 75—6 |

HYLAND BIZOT, *Primary Examiner.*

ERNEST L. WEISE, *Assistant Examiner.*